Nov. 12, 1968  J. W. SCHMIDT  3,410,375
LIQUID COOLED SELF-ADJUSTING DISC BRAKE
Filed July 3, 1967  2 Sheets-Sheet 1
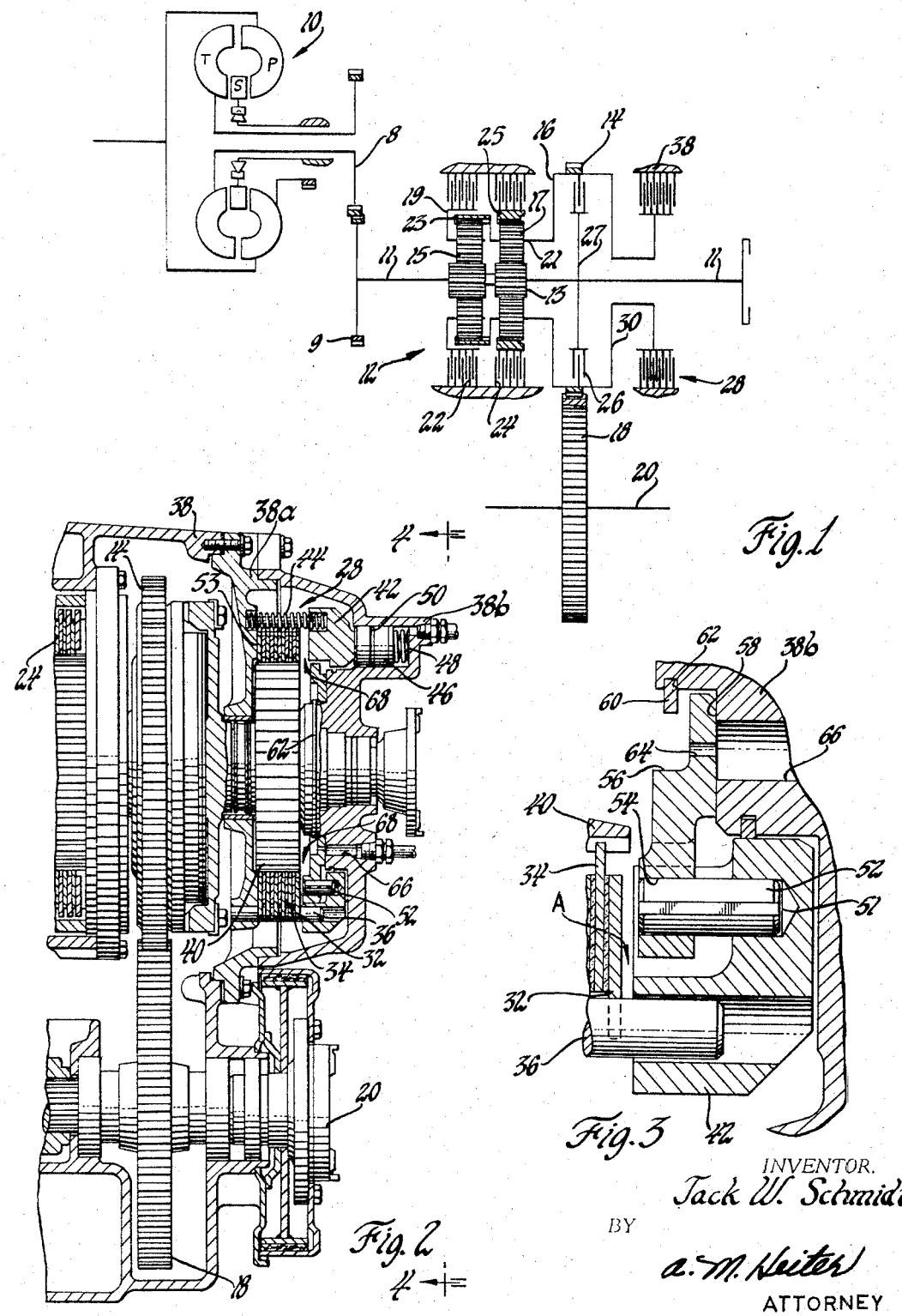
INVENTOR.
Jack W. Schmidt
BY
a. M. Leiter
ATTORNEY Nov. 12, 1968  J. W. SCHMIDT  3,410,375
LIQUID COOLED SELF-ADJUSTING DISC BRAKE
Filed July 3, 1967  2 Sheets-Sheet 2

INVENTOR.
Jack W. Schmidt
BY
a. M. Leiter
ATTORNEY

# United States Patent Office 3,410,375
Patented Nov. 12, 1968

3,410,375
LIQUID COOLED SELF-ADJUSTING DISC BRAKE
Jack W. Schmidt, Indianapolis, Ind., assignor to General Motors Corporation, Detroit, Mich., a corporation of Delaware
Filed July 3, 1967, Ser. No. 650,728
9 Claims. (Cl. 188—264)

ABSTRACT OF THE DISCLOSURE

A multiple disc brake having a wear adjusting member and coolant supply means is disclosed wherein the adjusting member and the coolant supply means are interconnected by friction engagement which permits relative movement between them to compensate for brake wear when the brake is applied. A coolant supply means has a valve member which opens and closes as the brake is engaged and disengaged respectively and is unaffected in the operation by brake wear compensation of the adjusting means.

---

This invention relates to vehicle brakes and more particularly to self-adjusting liquid cooled disc brakes. In prior liquid cooled brakes, the coolant is supplied either continuously to the brake or supplied through a valve which is actuated either hydraulically or mechanically by the operator brake pedal. When the coolant flows continuously and the brake is engaged, before the friction surfaces can come into contact, the liquid between them must be forced out of this space thereby slowing the brake apply and decreasing brake efficiency. When a separate valve is used, actuated either hydraulically or mechanically, hydraulic lines or mechanical linkage is necessary to connect the valve to the brake pedal. The present invention eliminates both of these conditions by combining a plate valve with the pressure plate in the brake so that the plate valve will be closed when the brake is disengaged and opened when the brake is engaged without the use of additional hydraulic lines or linkages.

An object of this invention is to provide an enclosed multiple disc brake having a wear adjustment member and a coolant supply valve means interconnected so that a large amount of coolant is supplied when the brake is engaged and a relatively small amount of coolant is supplied when the brake is disengaged with the valve movement being unaffected by brake wear and the adjustment associated therewith.

Another object is to provide a multiple disc vehicle brake wherein a coolant supply valve is operative to open when the brake is engaged, closed when the brake is disengaged, unaffected by brake wear.

Another object is to provide an improved multiple disc brake having friction discs wherein a pressure plate, which is actuated by apply piston means, has a spring pin member affixed thereto and is in friction engagement with a plate valve which is moveable between stop members by the apply piston means and the pressure plate to admit a large amount of coolant in one position and a small amount of coolant in another position and the friction force holding the spring pin member and the plate valve is overcome by the apply piston means thereby permitting the pressure plate to move toward the friction discs to compensate for wear of the friction disc surfaces.

Other objects and advantages of the invention will hereinafter become more fully apparent in the following description of the drawings which illustrate a preferred embodiment wherein:

FIGURE 1 is a diagrammatic view of a transmission in which the present invention may be incorporated.

FIGURE 2 is a plan view, partly in section, showing the preferred embodiment of the invention incorporated in a transmission.

FIGURE 3 is an enlarged view of a portion of FIGURE 2.

Figure 4:
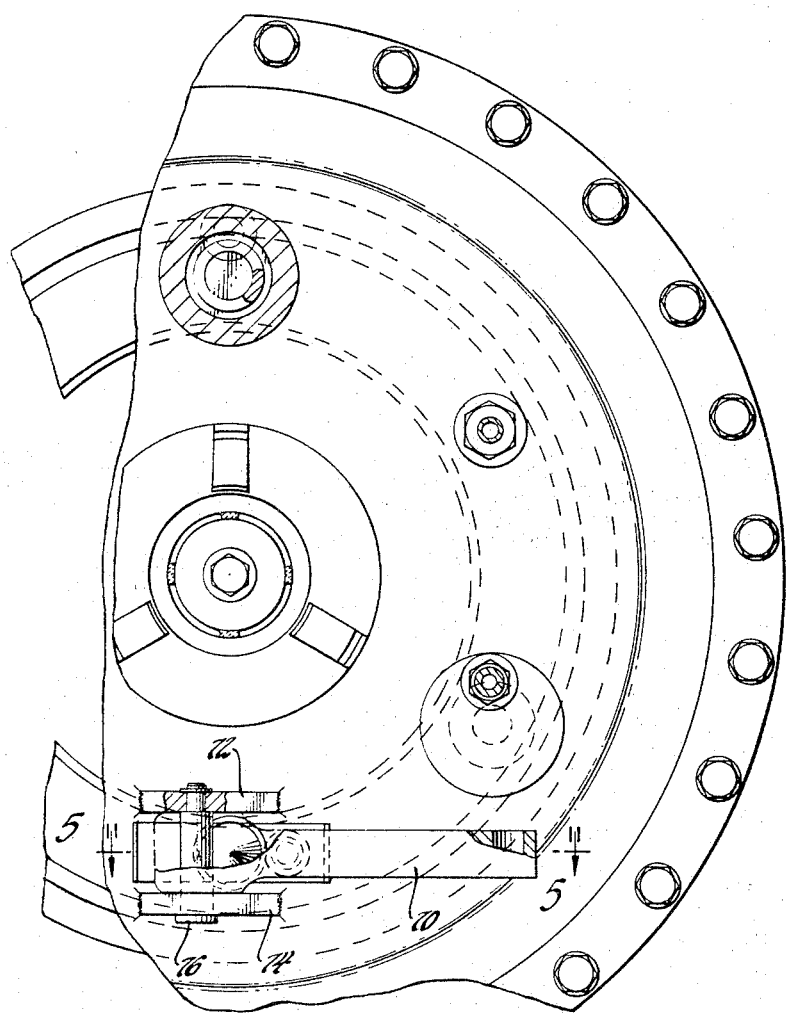
FIGURE 4 is a partial end view of the transmission shown in FIGURE 2.

Referring now to the drawings wherein like reference characters designate like or corresponding parts throughout the several views, there is shown in FIGURE 1 a transmission having a torque converter 10 adapted to drive a forward-reverse planetary gear set 12 having an output number 16 connected to a drive gear 14. An output gear 18 is secured to an output shaft 20 and is driven by the drive gear 14. To provide various gear ratios from input to output, a brake 22 or 24 or a clutch 26 may be selectively applied. A vehicle brake 28 is selectively connected to a hub 30 to the drive gear 14. When it is desired to stop the vehicle, the vehicle brake 28 is applied thereby preventing rotation of drive gear 14, output gear 18, and the output shaft 20.

The torque converter 10 has a pump element P, a turbine element T, and a stator element S. The torque converter operates as a conventional engine driven torque converter. The turbine element T is drivingly connected by a set of spur gears 8 and 9 to an input shaft 11 which drives a double sun gear 13. The double sun gear 13 meshes with planet pinions 15 and 17 which are rotatably mounted on carrier members 19 and 21 respectively. The planet pinions 15 and 17 also mesh with ring gears 23 and 25 respectively. Carrier member 19 is operatively connected to brake 22 while carrier member 21 is drivingly connected to output member 16. The ring gear 23 is drivingly connected to carrier member 21 while the ring gear 25 is operatively connected to brake 24. To establish a forward low ratio drive, the brake 24 is engaged thereby preventing rotation of ring gear 25 so that a speed reduction is achieved in the planetary gear set. To establish a forward high ratio drive, the clutch 26 is engaged, while the brake 24 is disengaged, thereby connecting the input shaft 11 directly to the output member 16 and drive gear 14 via a hub member 27 which is drivingly connected to the input shaft 11 and the clutch 26. To establish a reverse drive, brake 22 is engaged thereby preventing rotation of carrier 19 so that the ring gear 23, carrier 21 and output member 16 are driven in a direction opposite to input shaft 11.

The vehicle brake 28, as seen in FIGURE 2, is a multiple disc brake having alternate friction surfaces 32 and 34. Friction surfaces 32 are held from rotation by a plurality of pins 36 which are secured to a brake anchor plate 38a which is a detachable portion of the transmission housing 38. The friction surfaces 34 are splined to a flanged portion 40 of the hub 30 and rotate with the driven gear 14, the output gear 18, and the output shaft 20. The brake 28 also has a pressure plate 42 slidably mounted on a rear extension housing 38b, which is a detachable portion of the transmission housing 38, and the pins 36. Pressure plate 42 is held in a disengaged position by a plurality of coil springs 44 which are held in compression between the brake anchor plate 38a and the pressure plate 42. The pressure plate 42 is placed in engagement by plurality apply pistons 46 which are hydraulically actuated by fluid pressure from an external device such as a foot pedal actuated master cylinder or the like not shown. The apply pistons 46 are cylindrical in shape, slidably mounted in cup-shape portions 48 of the extension housing 38b and are each surrounded by a seal member 50 to prevent the brake apply fluid from leaking past the apply piston 46 into the transmission housing. Preferably there are three apply pistons 46 equally spaced about the annual surface of the pressure plate 42. When the master cylinder is actuated, the apply piston 46 is moved toward the pressure plate 42 thereby forcing the pressure plate 42 into contact with one of the friction members such as 32. The alternating friction members 32 and 34 are then placed in contact whereby frictional drag between these members will slow the rotation of hub 30 and the driven gear 14 thereby slowing the output gear 18 and output shaft 20 and causing them to stop. The surface 53 of brake anchor plate 38a prevents movement of the friction members 32 and 34, to the left as viewed in FIGURE 2, when the brake 28 has been fully engaged.

The pressure plate 42 has a plurality of blind apertures 51 with pins 52 pressed therein. The pins 52 are also pressed into a plurality of apertures 54 of a plate valve 56. Preferably the pin 52 is a roll pin made of spring steel so that the friction force existing between pin 52 and aperture 54 will remain relatively constant throughout the life of the brake 28. In the preferred embodiment, the apertures 51 and 54 are of equal size and the pins 52 contact at least a portion of the closed end of the blind aperture 51 when they are pressed therein. When the pressure plate 42 is urged to a disengagement position by the springs 44, the plate valve 56 comes to rest against a flat annular abutment surface 58 of the extension housing 38b. When the pressure plate 42 is urged to the engagement position by the apply piston 46, the plate valve 56 comes to rest against a stop member 60 such as a snap ring which is held in a groove 62 in the extension housing 38b. The movement of the plate valve 56 is limited to the amount of free pack brake clearance generally designated A so that when the plate valve 56 is held from further movement by stop member 60, the vehicle brake 28 should be fully applied. The friction members 32 and 34 of the brake 28 will experience some wear during operation. To compensate for this wear, the apply piston 46 will develop sufficient force due to the pressure in chamber 48 to cause the pressure plate 42 and the pin 52 to overcome the frictional resistance in aperture 54 thereby allowing the pressure plate to advance relative to the plate valve 56. However, the free pack brake clearance A will not be affected by this adjustment since the clearance A is determined only by the movement of the plate valve 56 between the abutment surface 58 and stop 60. The springs 44, which cause the brake to disengage, do not have sufficient force to overcome the frictional engagement between the pin 52 and the plate valve 56. Thus once a new pressure plate position relative to the plate valve 56 has been established, it will not change on brakes disengagement.

In an alternative construction, the apertures 51 and 54 may be designed so that the friction force existing between pins 52 and apertures 51 is greater than the friction force existing between the pins 52 and apertures 54. Thus, when an adjustment is necessary, relative movement between the pins 52 and the plate valve 56 will occur due to the lesser friction force existing therebetween. In yet another alternative construction, the apertures 51 and 54 may be the same size and the pins 52 are not pressed into apertures 51 in an amount sufficient to permit them to contact the closed end of the apertures 51. In this situation when an adjustment is necessary, the pins 52 may move relative to either plate valve 56 or pressure plate 42 or both. However, if this construction is used, care must be taken to insure that the pins 52 do not contact the friction members 32 during application of the vehicle brake 28.

The plate valve 56 is generally annular in shape and has a restriction passage 64 which is aligned with a fluid supply passage 66 in the extension housing 38b. The fluid supply passage 66 received fluid from a coolant pump not shown. During disengagement of the brake, a small amount of coolant fluid passes through the restriction passage 64 and is admitted to the brake chamber 68. This provides sufficient cooling and lubrication to the brake when it is operating in a disengaged position. When the vehicle brake 28 is engaged, the plate valve 56 moves to fully open the coolant passage 66 thus permitting a large amount of coolant to flow between plate valve 56 and abutment surface 58 into brake chamber 68 to avoid overheating of the brake. A clearance, not shown, may be provided between pins 36 and friction members 32 to allow coolant to enter this portion of the brake also. Thus an interconnected brake adjusting mechanism and coolant supply mechanism are achieved. The amount of coolant flow during brake engagement is not affected by brake wear since the plate valve 56 opens and closes the same amount each time. It will be appreciated that if it is desired to have no cooling or lubrication when the brake is disengaged, the restriction passage 64 may be eliminated.

Figure 5:
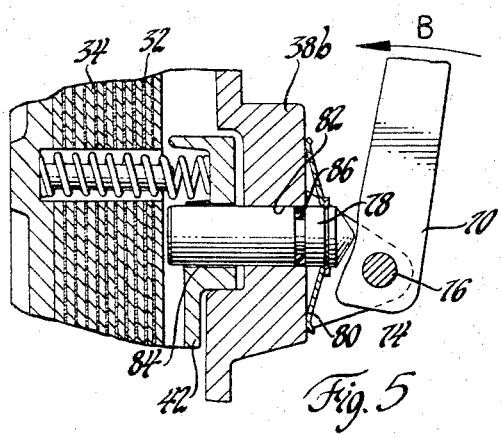
FIGURE 5 is a sectional view taken along line 5—5 in FIGURE 4.

FIGURES 4 and 5 show a manual brake apply arrangement which may be used in conjunction with the hydraulic brake apply as a parking brake or emergency brake. The manual brake has a lever 70 pivotally connected between two protuberant members 72 and 74 of the housing 38b by a pin 76. An engagement rod 78 is held against the lever 70 by a leaf spring 80 and is slidably mounted in an aperture 82 in the housing 38 and an aperture 84 in the pressure plate 42. A seal member 86 prevents leakage of fluid inside the housing 38b past the engagement rod 78. The lever 70 may be connected by any suitable linkage to a manual brake lever, not shown, so that when it is desired to apply the brake manually, the lever 70 is pivoted about the pin 76 in the direction of arrow B thereby forcing the rod 78 into engagement with friction surface 32. The friction surfaces 32 and 34 are thus placed in contact and prevent rotation of hub 30, driven gear 14, output gear 18 and the output shaft 20. This brake is normally used as a parking brake when the vehicle is not moving, therefore, no heat is generated in the brake 28 and cooling of the brake is not necessary.

What is claimed is:

1. In a vehicle brake having a housing; an output shaft; a disc brake having an engaged and disengaged position comprising a pressure plate slidably mounted on said housing, apply piston means operatively mounted in said housing and contacting said pressure plate, pressure means operative to move said apply piston means and said pressure plate in one direction to establish said engaged position, return spring means held in compression between said housing and said pressure plate and operative to move said pressure plate and said apply piston means in another direction to establish said disengaged position, valve means operatively connected to said pressure plate by adjustable friction means, and fluid supply means for supplying coolant to said valve means, said valve means operative to permit a large amount of coolant to said disc brake when the engaged position is established.

2. The invention defined in claim 1 and said valve means including a plate valve having an aperture, a restriction passage therein and being moveable to an open and a closed position, a fluid passage in said housing communicating said fluid supply means with said restriction passage when the plate valve is in the closed position, an abutment surface on said housing for establishing the closed position and a stop member on said housing for establishing the open position; and said adjustable friction means including a blind aperture having a closed end in said pressure plate, and a spring pin in friction engagement with said aperture in the plate valve and in friction engagement with said blind aperture and contacting said closed end thereof; said spring pin and said pressure plate being moveable in one direction relative to said plate valve to permit compensation for wear in said disc brake.

3. The invention defined in claim 1 and said valve means including a plate valve having an aperture, a restriction passage therein and being moveable to an open and a closed position, a fluid passage in said housing communicating said fluid supply means with said restriction passage when the plate valve is in the closed position, an abutment surface on said housing for establishing the closed position and a stop member on said housing for establishing the open position; and said adjustable friction means including a pin member in low force friction engagement with said aperture and in high force friction engagement with a blind aperture in said pressure plate; said pin member and said pressure plate being moveable in one direction relative to said plate valve to permit compensation for wear in said disc brake.

4. A vehicle brake for use in a power transmission having a housing and output shaft comprising a multiple disc brake having an apply position, an off position and a plurality of friction members, alternately operatively connected to said housing and said output shaft; at least one apply piston mounted in said housing for establishing said apply position; a pressure plate slidably mounted in said housing moveable in one direction by said apply piston; return spring means held in compression between said housing and said pressure plate for establishing said off position; valve means including a plate valve; adjustable friction means including a pin in friction engagement with said pressure plate and said plate valve; and fluid supply means for supplying coolant and lubricant to said valve means; said plate valve operative to permit a large amount of fluid to said multiple disc brake for cooling when the apply position is established and a small amount of fluid when the off position is established; said adjustable friction means being operable to allow relative movement between said pressure plate and said plate valve in one direction to compensate for wear of said friction members.

5. A vehicle brake having an engaged and disengaged position comprising; a housing having a fluid passage means therein, an output member, a plurality of friction discs alternately operatively connected to said housing and said output member and subject to wear during operation, a pressure plate slidably mounted on said housing and subject to movement into and out of contact with said friction discs, apply piston means carried by said housing for moving said pressure plate into contact with at least one of said friction discs to establish said engaged position, spring means held in compression between said pressure plate and said housing to move the pressure plate out of contact with said friction disc to establish said disengaged position, valve means having an opened and closed position for communicating fluid from said fluid passage means to said friction discs when said opened position is established and the vehicle brake is engaged, stop means on said housing to establish said opened and closed position, and adjustable friction means operably connecting said pressure plate and said valve means so that the valve means is in the opened position when the pressure plate is moved into contact with the friction discs and in the closed position when the pressure plate is moved out of contact with the friction discs, said adjustable friction means permitting movement of said pressure plate relative to said valve means when said opened position is established to compensate for brake wear in said friction discs.

6. The invention defined in claim 5 and said apply piston means including a plurality of cup-shaped apertures in said housing, a cylindrical piston slidably mounted in each of said cup-shaped apertures and pressure supply means for supplying fluid under pressure to said cup-shaped apertures to cause said pistons to move said pressure plate into contact with said friction discs thereby establishing said engaged position; and said valve means including a plate valve having a restriction passage therein aligned with said fluid passage means and coolant supply means supplying coolant fluid from a coolant source to said fluid passage means; said restriction passage being effective to supply a small amount of coolant to said friction discs when said valve means is in said closed position.

7. In a vehicle brake having an engaged and disengaged position; a housing having an abutment surface and stop means; an output member; a plurality of friction discs alternatively operatively connected to said housing and said output member; an annular plate member having an aperture and being moveable to said stop means and said abutment surface when said vehicle brake is in said engaged and disengaged position respectively; an annular pressure plate slidably mounted in said housing and being moveable into and out of contact with said friction discs when said vehicle brake is engaged and disengaged respectively; a blind aperture having a closed end in said pressure plate; apply piston means slidably mounted in said housing and being operative to move said pressure plate into contact with said friction discs; return spring means held in compression between said housing and said pressure plate and operative to move said pressure plate out of contact with said friction discs; and pin means in friction force engagement with the aperture in said plate member and in contact with the closed end of said blind aperture in said pressure plate; said apply piston means being capable of supplying a force to said pressure plate greater than said friction force when said plate member is in contact with said stop means and said pressure plate is out of contact with said friction discs thereby causing the pressure plate and said pin means to move relative to the plate member so that the pressure plate will contact the friction discs.

8. The invention defined in claim 7 and said pin means being a resilient hollow cylindrical member having a longitudinal slot and an outside diameter larger than the apertures in said plate member and said pressure plate.

9. The invention defined in claim 8 and further including: coolant supply means for supply coolant to said vehicle brake including a fluid passage in said housing communicating to said abutment surface; and a restriction passage in said plate member axially aligned with said fluid passage, so that a small amount of coolant is admitted to said vehicle brake when said plate member contacts said abutment surface and a large amount of coolant is admitted to said vehicle brake when said plate member contacts said stop means.

References Cited

UNITED STATES PATENTS

| | | |
|---|---|---|
| 2,551,252 | 5/1951 | Du Bois. |
| 2,940,549 | 6/1960 | Hause et al. _____ 188—72 |
| 3,086,634 | 4/1963 | Reed. |
| 3,292,758 | 12/1966 | Polak. |

MILTON BUCHLER, *Primary Examiner.*

G. E. A. HALVOSA, *Assistant Examiner.*